United States Patent [19]

Lageder et al.

[11] Patent Number: 5,213,306
[45] Date of Patent: May 25, 1993

[54] QUICK-ACTION FLAP

[75] Inventors: Heinrich Lageder, Würenlingen; Jan Ramisch, Fislisbach; Karel Skala, Windisch, all of Switzerland

[73] Assignee: Asea Brown Boveri Ltd., Baden, Switzerland

[21] Appl. No.: 452,366

[22] Filed: Dec. 19, 1989

[30] Foreign Application Priority Data

Dec. 23, 1988 [CH] Switzerland .................. 4778/88

[51] Int. Cl.⁵ .................. F16K 31/163; F16K 31/128
[52] U.S. Cl. .................. 251/48; 251/58; 251/76; 251/298
[58] Field of Search ............ 251/58, 228, 229, 298, 251/50, 52, 54, 47, 48; 137/514, 527, 527.8

[56] References Cited

U.S. PATENT DOCUMENTS

| | | | |
|---|---|---|---|
| 1,531,146 | 3/1925 | Skortz | 251/52 |
| 2,991,795 | 7/1961 | Fraser et al. | 251/52 |
| 3,106,220 | 10/1963 | Hose | 137/527.8 |
| 3,177,894 | 4/1965 | Camp | 137/514 |
| 3,522,929 | 8/1970 | DeSimone | 251/298 |
| 3,650,506 | 3/1972 | Bruton | 251/58 |
| 3,666,234 | 5/1972 | Scaramucci | 251/298 |
| 3,789,872 | 2/1974 | Elliott | 137/514 |
| 3,937,441 | 2/1976 | Baumann | 251/298 |
| 3,938,541 | 2/1976 | Polacheck et al. | 137/242 |
| 3,942,551 | 3/1976 | Schuller et al. | 137/514 |
| 4,556,192 | 12/1985 | Ramisch | 251/58 |
| 4,570,899 | 2/1986 | Kingham | 251/52 |
| 4,573,494 | 3/1986 | Spurbeck | 251/58 |
| 4,669,500 | 6/1987 | Strelow | 137/514 |

FOREIGN PATENT DOCUMENTS

| | | |
|---|---|---|
| 0143910 | 6/1985 | European Pat. Off. . |
| 1201146 | 9/1965 | Fed. Rep. of Germany . |
| 1947865 | 4/1971 | Fed. Rep. of Germany . |
| 2618517 | 1/1989 | France . |
| 972870 | 10/1964 | United Kingdom . |

Primary Examiner—George L. Walton
Attorney, Agent, or Firm—Burns, Doane, Swecker & Mathis

[57] ABSTRACT

In a quick-action flap, in which opening occurs by means of hydraulic actuation and closing can be initiated by a spring, two independent systems are provided, namely a servo system. (1) and a flap disk system (2), which are connected to one another via a coupling (1a, 2a). The coupling itself has, between the coupling part (1a) on the servo side and the coupling part (2a) on the flap disk system side, a free-wheel which makes it possible for the forces occurring upon impact of the flap disk (14) on the seating ring in the flap casing (9) to be divided up in accordance with the kinetic energy of the moving masses of each system (1, 2). The free-wheel thus distributes the stressing over two successive impacts, whereby the stress in the lever (12) of the flap disk (14) is reduced by approximately one half. A hydraulic brake in the servo system (1) ensures that the closing speed of the flap disk is kept constant approximately in the last third of the closing process.

7 Claims, 6 Drawing Sheets

Fig. 7
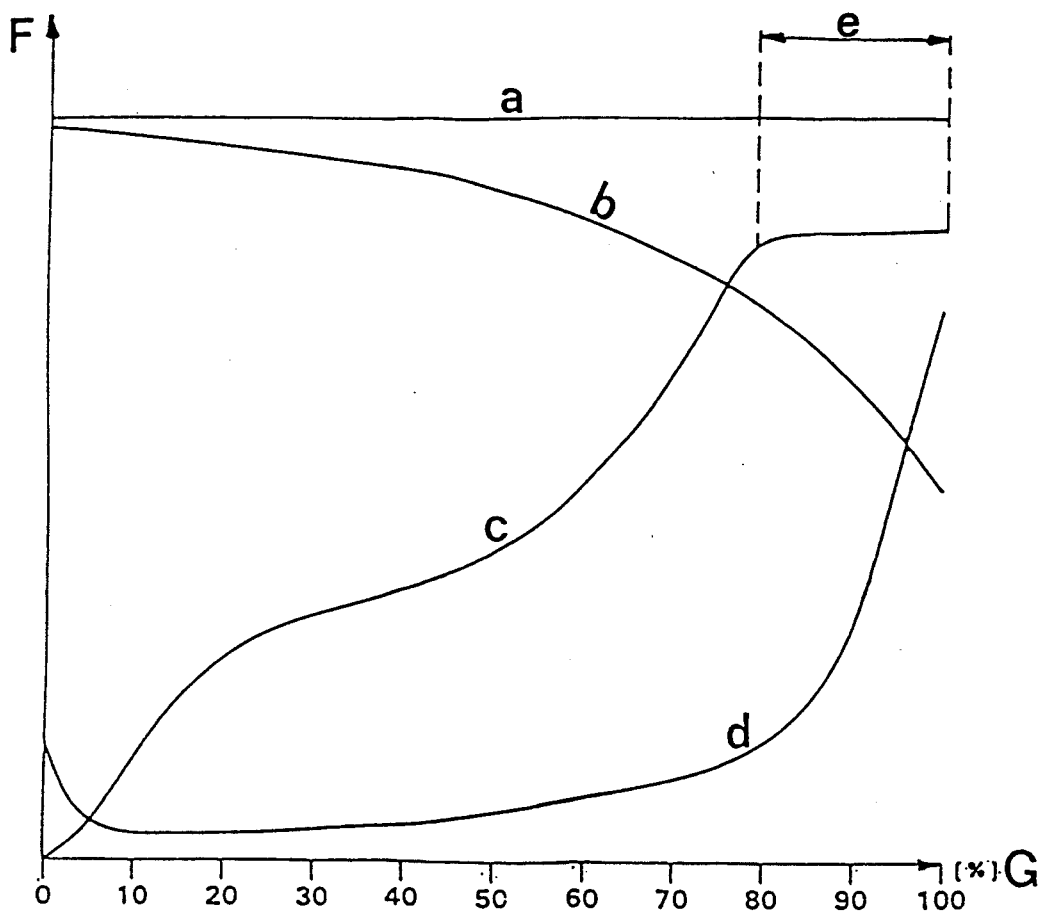
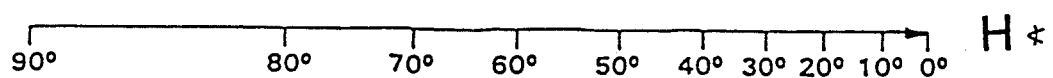

QUICK-ACTION FLAP

BACKGROUND OF THE INVENTION

1. Field of the Invention

The present invention relates to a quick-action flap according to the preamble of claim 1.

2. Discussion of Background

A quick-action fitting together with an intercept valve are placed in steam turbines between the respective reheater and the intermediate pressure turbine. In dependence on the steam data and the type of mounting, the quick-action fitting can be a valve or a flap, preferably a swing flap. The opening of this quick-action fitting occurs hydraulically, closing is initiated via a spring. A swing flap possesses the advantage over a valve that it does not have to deflect the steam and therefore, naturally causes lower flow losses. Furthermore, a swing flap facilitates an advantage arrangement on the intermediate pressure turbine. On the other hand, it is to be noted that a swing flap is subjected to this flow to a greater degree than a valve and thus experiences greater mechanical loading, i.e., in respect of loading, the swing flap structure is highly stressed. If the flow processes in a swing flap are considered, it is to be noted that, during the closing process, the steam pressure on the outflow side of the flap falls and thus the pressure difference at the disk of the flap rises. The entire swing flap is speeded up by the force growing in the flow direction to such an extent that a high, and for the construction of the swing flap, dangerous impact speed of the flap disk against the seating ring in the flap casing occurs. Although the conclusion could be drawn that the construction should be strengthened, with increased mass the kinetic energy would also rise. The impact speed could be reduced by means of a hydraulic brake; however, any deceleration causes braking forces (mass times deceleration) which would greatly load the entire mechanism of the swing flap. It is also to be borne in mind that, even if the mechanism of the flap withstands the loading caused by the braking force, a hydraulic brake designed for a low closing speed would have the great disadvantage for such a flap that the closing speed would be too low in respect of the task and correspondingly the closing time would be too long, not to mention the fact that, in such a constellation, the steam pressure behind the flap would fall even further, which would cause the pressure difference and thus the force on the flap to rise even more.

In addition, the smaller the chambers through which there is flow, between the quick-action flap and the entry to the blading, the quicker the pressure behind the flap disk must drop due to falling accumulation effect, which in turn must have a negative effect on the impact speed of the flap against the seating ring. If this were to be remedied, one would have to provide long lines in each case behind the flap, which alone could provide large accumulation capacities. However, it is part of the definition of the object to place the fittings directly in front of the turbine;

- in order to minimize the accumulation capacity, in order to avoid damage to the turbine due to excessive speed of rotation;
- because of more favorable use of space.

SUMMARY OF THE INVENTION

Accordingly, one object of this invention, as defined in the claims, is to minimize the forces occurring in a quick-action flap of the type named at the beginning at maximum closing speed of the flap disk on the impact of the latter against the flap casing seat.

This is achieved by providing a hydraulic brake which has such a profile that the speed of the flap disk is held constant, after reaching the maximum permissible impact speed, until the impact. This has the advantage that additional braking forces, thus the product of mass and deceleration, which can load the transmission mechanism of the quick-action flap do not occur. Furthermore, in order to reduce the forces occurring upon impact, on the disk and lever of the quick-action flap, a free-wheel is provided between the moving parts, which divides up the impact energy in such a way that, in accordance with the separation of masses made, the stressing is distributed over two impacts, that is to say after the flap disk has struck the seating ring, all the other masses from the coupling on the servo system side onwards continue to turn around a particular free-wheel provided in the coupling so that their kinetic energy is not braked until the second impact. This has the great advantage that, with the given construction of the quickaction flap, the impact speed can be maximized in dependence on the envisaged dividing-up of the masses without thereby stressing the transmission mechanism to any great extent. Therefore, if both the braking forces and the impact forces can be reduced, it is possible to raise the permitted operating data for this quick-action flap.

Advantageous expedient further developments of the means of achieving the object according to the invention are defined in the further dependent claims.

An exemplary embodiment of the invention is described below in greater detail with reference to the drawing. All elements which are not required for the immediate understanding of the invention are omitted. Like reference numerals designate identical or corresponding parts throughout the several views.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2a shows the situation in the coupling at a position according to FIG. 2, FIG. 3a shows the corresponding situation of the coupling at this position according to FIG. 3, FIG. 6 shows a cross section through the lever of the flap disk in the region of the yoke and FIG. 7 shows a qualitative diagram of the curve of the various pressures and the closing speed.

FIG. 1 shows a section through a quick-action flap, here a swing flap, along the coupling shaft or the flap shaft. The system is divided into a servo system 1 and a flap disk system 2. The two systems 1, 2 are coupled via a denture clutch 1a, 2a, which can approximately halve the mass of all moving parts. The servo system itself consists, considered with respect to the outer parts, of a servo casing 17, the inner parts of which can appropriately be seen in FIGS. 2 and 3, and of a transmission casing 3, which is angled and connected to the flap casing 9. In the transmission casing 3, a servo rod 4 from the servo casing 17 is partially visible, which rod forms the connection via a coupler 5 to the coupling shaft 6. The coupler 5 itself is fixed eccentrically to a thickened part of the coupling shaft 6—in the manner of a piston rod—the two connection points for the servo rod 4 and the coupling shaft 6 each being made by a fixing bolt 8. For the mechanical construction refer to FIGS. 2 and 3. The coupling shaft 6 is two-point mounted 7 in the transmission casing 3 and extends to the coupling part 1a. Of the flap disk system 2, a part of the flap casing 9 can be seen, to be precise that part which lies in the plane of the coupling, which here is a claw coupling 1a, 2a. The flap disk 14 of the swing flap represented here can be seen provided it is in the open position. For better comprehension of the swung-out position and the kinematics of the flap disk 14, it is recommended here to refer to FIG. 5, in which the section V.—V. is represented The continuation of the coupling part 2a on the flap disk system side is a flap shaft 10, the diameter of which is stepped several times towards the outside. Symmetrically to the section plane V.—V. the eye 12a of the lever 12 mounted on the flap shaft 10 extends in the longitudinal direction, which lever in turn bears the flap disk 14, the connection of these two elements, namely lever 12 and flap disk 14, being made via a yoke 13. A wedge 11 through the eye 12a and flap shaft 10 ensures that the transmission of force from the servo system 1 via the coupling 1a, 2a to the lever 12 and finally to the flap disk 14 can be achieved. To the side of the eye 12a, the diameter of the flap shaft 10 is once more stepped. On this diameter there is a compensation bushing 28, the diameter of which E' is the same as the diameter E of the flap shaft 10 beyond the eye 12a. In order to relieve the flap shaft 10 axially when closing, the present construction has piston rings 29 which act on the same diameter $E = E'$ on both sides of the eye 12a. Thus, the compensation bushing 28 together with the piston rings 29 forms a pressure compensation system 15 which causes the swing flap 12, 12a, 13, 14 to be safer and faster. By means of this preventive measure, the previously used pilot valve becomes superfluous. The section planes IIa, IIIa through the coupling 1a, 2a are represented as FIGS. 2a and 3a and are explained there in conjunction with FIGS. 2 and 3.

FIG. 2 shows a section through the servo casing 17 and transmission casing 3. Furthermore, the flap casing 9, not lying in the same plane, is likewise represented in section in order to explain the outflow dynamics of the swing flap in general and of the flap disk 14 in particular. On the servo system side, in contrast to FIG. 1, the entire servo rod 4 can now be seen; also visible are a spring 18, which is only responsible for initiating the closing of the swing flap, and, on the top side of the servo rod 4, the envisaged hydraulic brake This consists of a brake piston 20 with a profiled contour 19 which, together with a braking edge 21 provided in the servo casing 17, makes possible the effect of the hydraulic brake Generally it can be said that the smaller the brake cross section is kept, the larger the braking forces acting on the swing flap. It is obvious that these braking forces load the transmission mechanism in a manner not to be underestimated In this figure, the flap disk 14 is represented in the first third of its closing process, thus at that point where it is caught to an increased extent by the steam flow 26. From this figure it can be easily understood that, as soon as the flap disk 14 begins to throttle in the closing process, the steam pressure beyond the seating ring 25 falls so that the pressure difference at the flap disk 14 itself rises Due to this rising force, the flap disk 14 is caught by the flow and accelerated against the seating ring 25, which then gives rise to the impact force. Of course, the hydraulic brake could be configured in such a way that, shortly before the impact of the flap disk 14 against the seating ring, the impact speed were suddenly reduced towards zero. However, this would allow excessively large braking forces to be exerted on the elements of the transmission mechanism, which forces would not be less, in terms of magnitude, than the unbraked impact forces. On the other hand, the hydraulic brake must not produce too low a closing speed, since this would undoubtedly excessively increase the closing time: the function, in terms of its task, of the quick-action flap of closing off the steam flow if the control valve fails in a sudden release of load, consequently could not be fulfilled.

Figure 1:
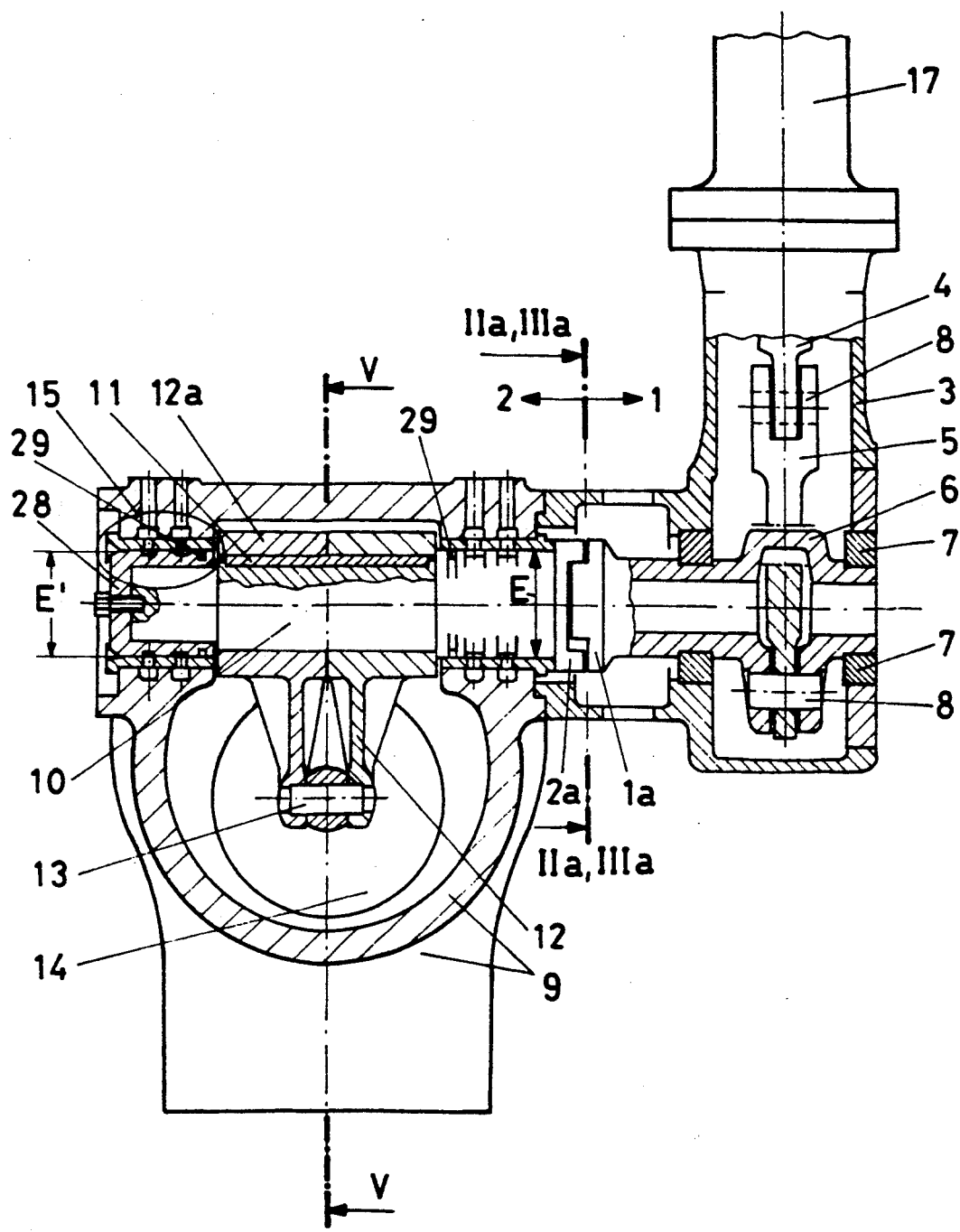
FIG. 1 shows a section of a quick-action flap.

The hydraulic brake envisaged here ensures that the flap disk 14 moves from approximately 60° onwards in the closing direction with a constant closing speed of approximately 5 m/s. Calculations have shown that the swing flap represented here at an impact speed of 5 m/s, which cannot be reduced any further because of the closing time to be provided, allows a stress of approximately 700 N/mm² to arise at the lever 12 of the flap disk 14. If one assumes that, in addition, temperatures of up to 565° C. can prevail, it can easily be imagined that the bearing parts of the swing flap, in particular the lever 12, are constantly at great risk. The stress problem cannot be satisfactorily solved even by the use of high-alloy heat-resisting steels. Reduction of the forces and stresses occurring in the required cross sections upon impact of the flap disk 14 on the seating ring 25 is brought about here by making servo system 1 and flap disk system 2 independent via the coupling 1a, 2a (see FIG. 1) in such a way that the coupling is provided with a free-wheel. This free-wheel ensures that the masses of the moving parts of the entire system of the swing flap are kinematically separated, so that the stressing upon impact of the flap disk 14 on the seating ring 25 is distributed over two successive impacts. Therefore, after the flap disk 14, slowed down by braking to constant closing speed, has struck the seating ring 25, all the masses from the coupling onwards on the servo system side continue to turn and do not strike until later, their impact being delayed by the amount of the free-wheel.

Figure 2:
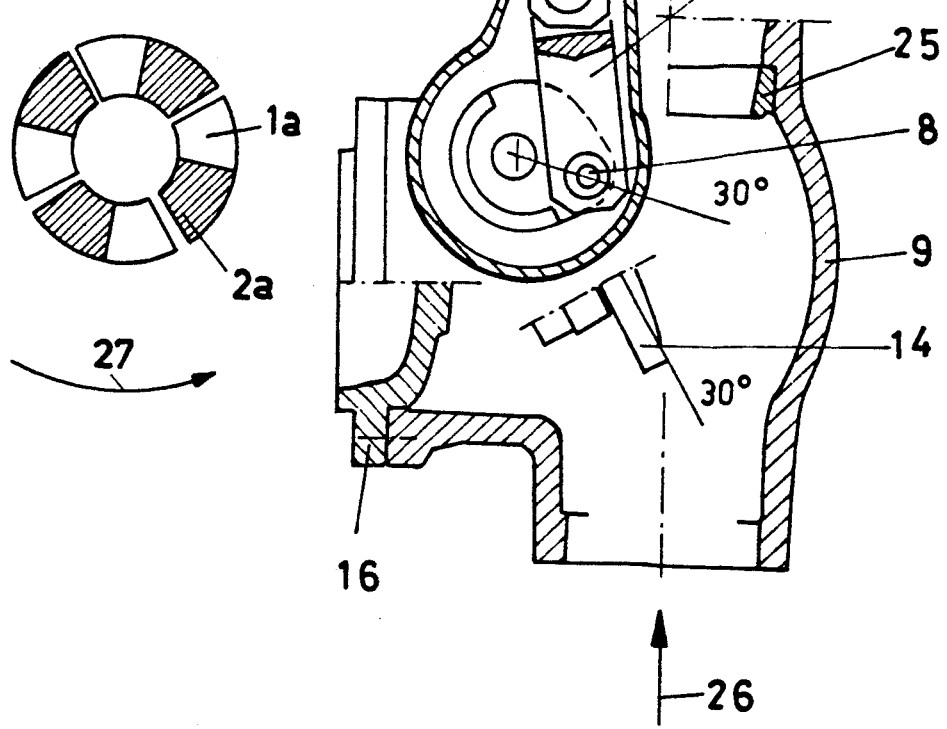
FIG. 2 shows a section of a servo system with a closing position of the flap disk of 30°.

FIG. 2 is a section through the plane IIa in FIG. 1 and represents the coupling ratio at the intermediate position of the swing flap 14 according to FIG. 2. From the direction of rotation 27 it can be clearly recognized that the individual claws 2a belonging to the flap disk system 2 drive, in the course of the closing process of the swing flap, the claws 1a of servo system 1, that is to say, during the acceleration phase governed by steam flow, of the flap disk 14, the servo system 1 assumes—due to the hydraulic brake appraised above—the function of a brake.

Figure 3:
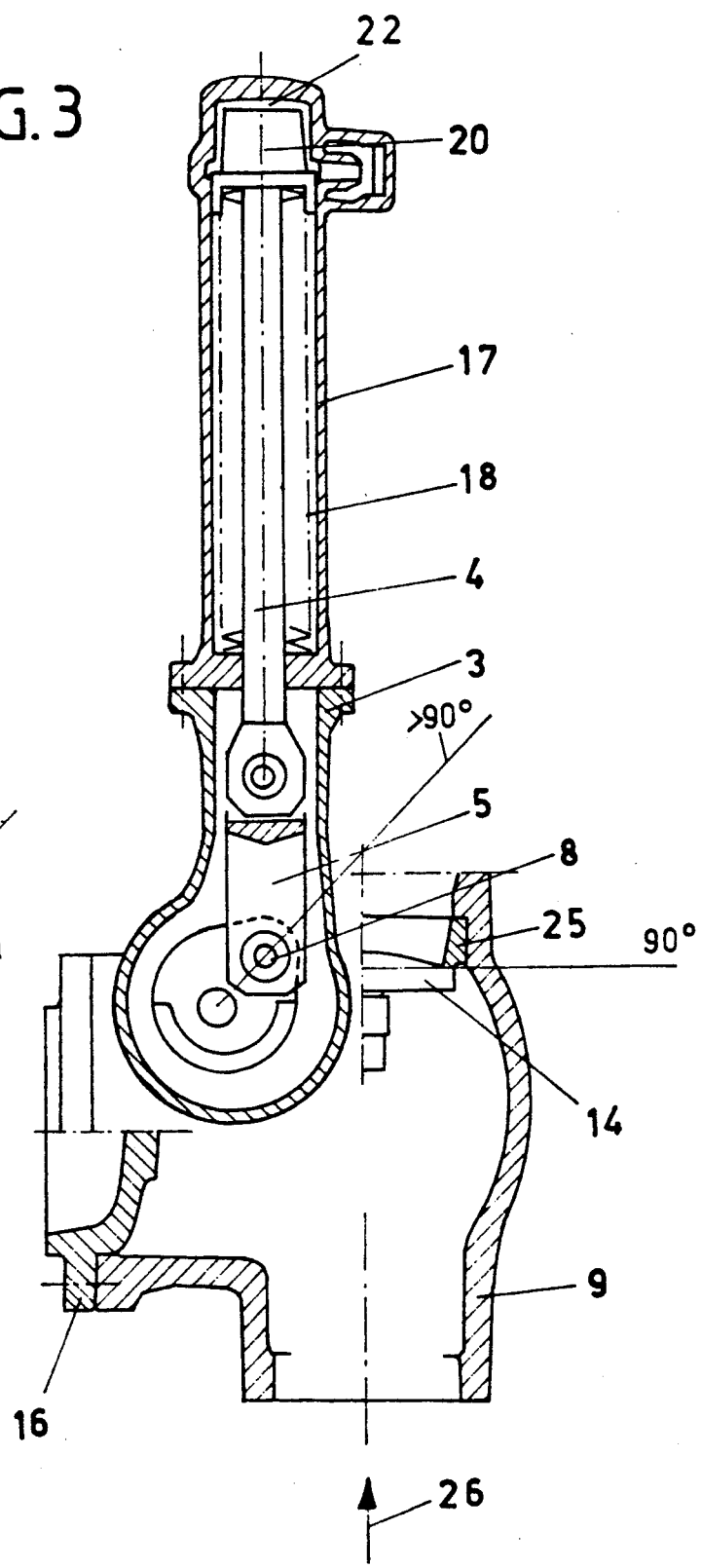
FIG. 3 shows a section of a servo system with a closing position of the flap disk of 90°, i.e. with flap closed.

How the conditions in the claw coupling 1a, 2a finally look, after the flap disk 14 has impacted on the seating ring 25, can be seen in FIG. 3, in particular 3a.

Firstly, it can merely be seen in FIG. 3 that the flap disk 14 is in the closing position and that the servo rod 4 has gone completely in.

In FIG. 3a it can be seen that the claws 2a have now reached the plane of the impact of the flap disk system A, which means the end stop for this coupling part. In this state it is clear that the claws 1a belonging to the servo system 1 can no longer be driven forwards and are consequently uncoupled from the impacted flap disk. For the coupling part of the servo system 1, this independence means that it can continue to turn by the free-wheel, which here in terms of coupling is a clearance angle C, until its claws 1a have reached the plane B which is given by the claws 2a of the flap disk system 2, which have previously been driven forward to a fixed position.

After this, the flap disk 14 strikes initially on the seating ring 25 with a kinetic energy which is determined by the mass of the moving parts of the flap disk system 2. The subsequent second impact, after passing through the clearance angle C in the claw coupling, brings the mass of the moving parts of the servo system 1 to a stop, the hydraulic brake being readily able in this interval to bring about an additional deceleration, which is particularly appropriate if the impacting mass of the servo system 1 is greater than that of the flap disk system 2.

Of course, other free-wheeling couplings can be used. It is important that the free-wheel should in each case make possible a genuine separation and independence of the two masses after the impact of the first mass. With a claw coupling, the free-wheel is fulfilled with a clearance angle C greater than 2°.

With regard to the stresses occurring at the lever 12 of the flap disk 14, this independence entails unexpected advantages: without reducing the closing speed of 5 m/s, the lever 12 is only loaded with a maximum of 400 N/mm$^2$ upon impact of the flap disk 14 on the seating ring 25. Thus, an optimum construction can be accomplished with customary materials.

Figure 4:
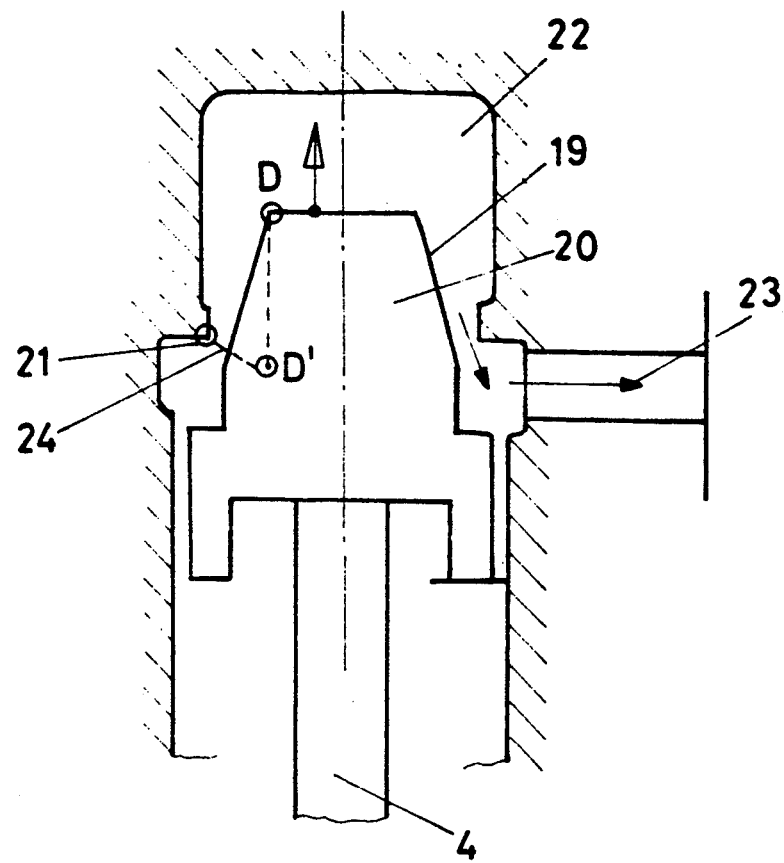
FIG. 4 shows an hydraulic brake.

FIG. 4 shows in greater detail the design and the effect of the hydraulic brake. If the flap disk—driven by the flow—has reached the maximum permissible impact speed of e.g. 5 m/s, the brake piston enters with the edge D into the braking chamber (edge 21). The exactly calculated contour of the brake piston keeps the speed of the system constant until the impact of the disk on the seating ring. The subsequent cylindrical part is intended for the free-wheel.

The throttling of the oil drain 23, which indicates the braking pressure of the servo system, is dependent on the size of the annular braking cross section 24, which is formed by the perpendicular distance of the braking edge 21 from the circumference of the brake piston 20.

Figure 5:
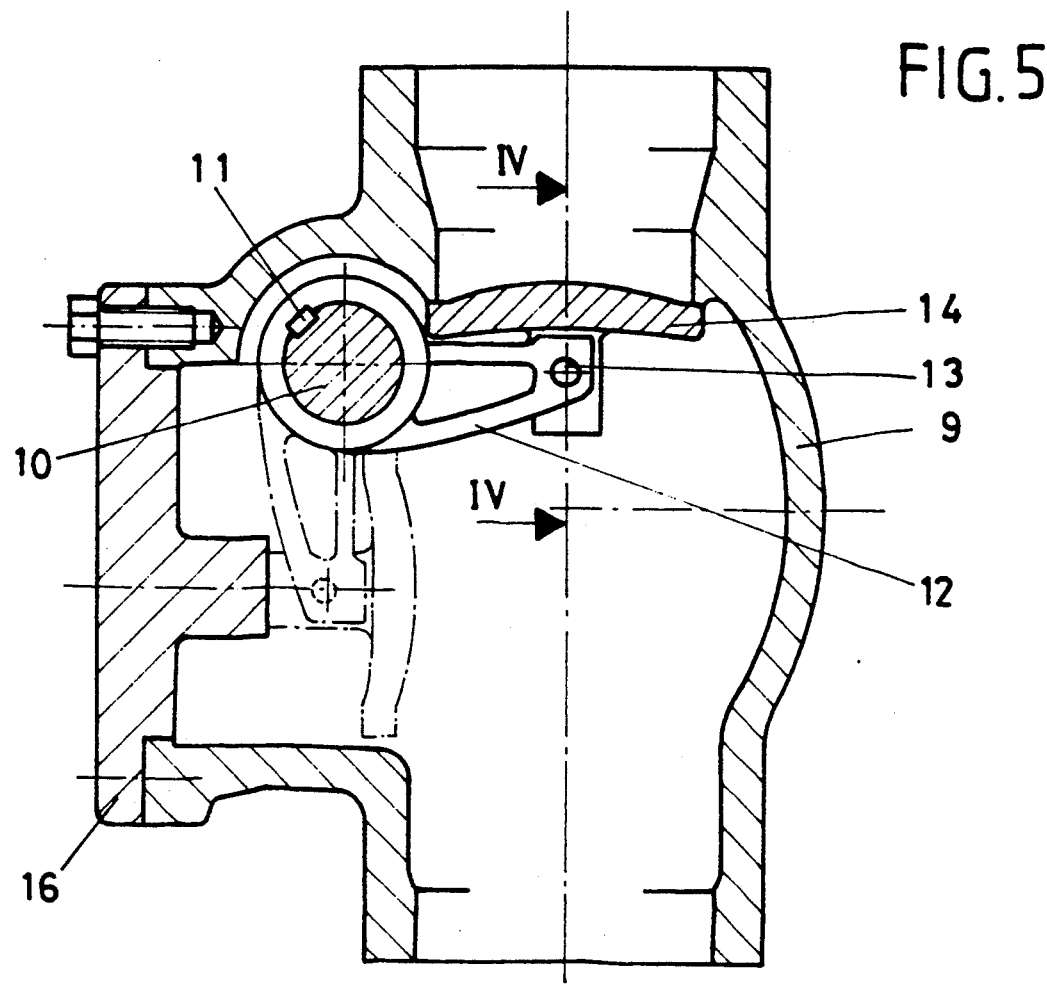
FIG. 5 shows a section through a flap casing.

FIG. 5 is a section through the flap casing 9 in the plane of the flap disk 14. It shows both extreme positions of the flap disk 14 and the construction of the lever 12; designed for constant stress. The flange 16 can, for example, have a casing-internal eye, which forms the stop of the swing flap in the open position. Of course, the stop surface of the flap disk 14 in closed position can be formed by the casing itself without the aid of a ring.

Figure 6:
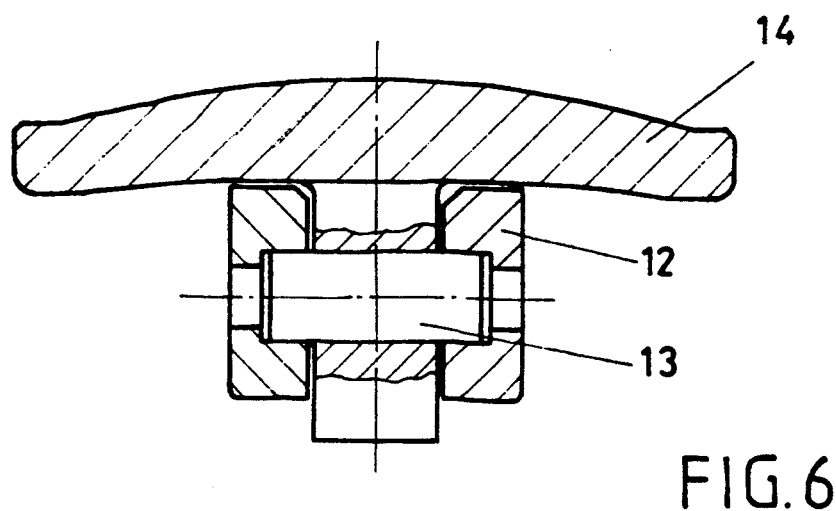

FIG. 6 shows the connection formed by a yoke 13 20 between lever 12 and flap disk 14. The changes in loading occurring quickly between braking and impact require a reliable connection between flap disk 14 and lever 12. A two-part lever 12 avoids the need for safety elements, since it secures laterally the yoke 13 which is released on disassembly.

FIG. 7 shows a diagram, in which the qualitative curve of the various pressures and the speed in the previously described quick-action flap system is represented as a function of the angle of the disk flap H and time in % G. The curve a represents the pressure ahead of the flap disk; conversely, the curve b shows the progression of pressure after the flap disk. It can be clearly seen here how the pressure falls rapidly with increasing flap angle H, in particular during the last 30° of the closing process. The curve c is of interest in that the closing speed of the flap disk held constant in approximately the last 30° of the closing process can be clearly seen. Here, the flat portion e represents the actual braking path. Finally, the curve d is also very informative, since the progression of the braking pressure in the servo system is shown there qualitatively.

Obviously numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A quick-action flap comprising:
    a flap casing;
    a flap disk system having a flap that is mounted on a flap shaft, said flap being movable with said flap shaft between an open and closed position within said flap casing;
    a servo system for opening and initiating closing of said flap, said servo system having a servo system coupling shaft substantially aligned with said flap shaft;
    a coupling means for connecting said flap shaft to said servo system coupling shaft, said coupling means including a coupling portion disposed on said flap shaft and a coupling portion disposed on said servo system coupling shaft;
    means for distributing impact forces that are generated during closure of said flap;
    said means for distributing including a rotational clearance angle disposed between said coupling portion of said flap shaft and said coupling portion of said servo system coupling shaft such that after said flap causes a first impact by closing against said casing, said servo coupling shaft is allowed to continue rotating through said rotational clearance angle unit said coupling portion of said servo system coupling shaft meets said coupling portion of said flap shaft and thereby causes a second impact, said clearance angle thus enabling said impact forces to be distributed over two impacts;
    said means for distributing impact forces including a hydraulic brake for limiting a speed of said flap during closure to a maximum permissible impact speed, said hydraulic brake disposed in said servo system.

2. A quick-action flap according to claim 1, wherein said coupling is a claw coupling and wherein said coupling portion of said flap shaft and said coupling portion of said servo system coupling shaft are each defined by claws that axially extend from one end of each shaft.

3. A quick-action flap according to claim 1, wherein said rotational clearance angle is greater than two degrees.

4. A quick-action flap according to claim 1, wherein said flap disk system includes piston rings mounted at opposite end regions of said flap shaft such that said flap disk system is substantially sealed.

5. A quick-action flap according to claim 4, wherein said flap disk system includes a lever for mounting said flap disk to said flap shaft, said lever including two lever parts that are connected by a yoke, said flap disk being supported on said yoke.

6. A quick-action flap comprising:
a flap casing;
a flap disk system having a flap that is mounted on a flap shaft, said flap being movable with said flap shaft between an open and closed position within said flap casing;
a servo system for opening and initiating closing of said flap, said servo system having*p2028Xa servo system coupling shaft substantially aligned with said flap shaft;
a coupling means for connecting said flap shaft to said servo system coupling shaft, said coupling means including a coupling portion disposed on said flap shaft and a coupling portion disposed on said servo system coupling shaft;
means for distributing impact forces that are generated during closure of said flap;
said means for distributing including a rotational clearance angle disposed between said coupling portion of said flap shaft and said coupling portion of said servo system coupling shaft such that after said flap causes a first impact by closing against said casing, said servo system coupling shaft is allowed to continue rotating through said rotational clearance angle until said coupling portion of said servo system coupling shaft meets said coupling portion of said flap shaft and thereby causes a second impact, said clearance angle thus enabling said impact forces to be distributed over two impacts;
said means for distributing impact forces including a hydraulic brake for limiting a speed of said flap during closure to a maximum permissible impact speed, said hydraulic brake disposed in said servo system, wherein said hydraulic brake includes a brake piston having a profiled contour, a brake chamber and an oil drain, said piston and said brake chamber being separated by an annular cross-section at a braking edge of said brake chamber, said annular cross-section being sized with respect to said oil drain to provide braking of said flap during closure of said flap, said annular cross-section being sized according to a perpendicular distance between a braking edge of said brake chamber and said profiled contour of said brake piston, said profiled contour having a profile such that said annular cross-section changes in size during closure of said flap.

7. A quick-action flap according to claim 6, wherein said profiled contour has a profile such that said annular cross-section decreases in size during closure of said flap.

* * * * *